Figure 1:
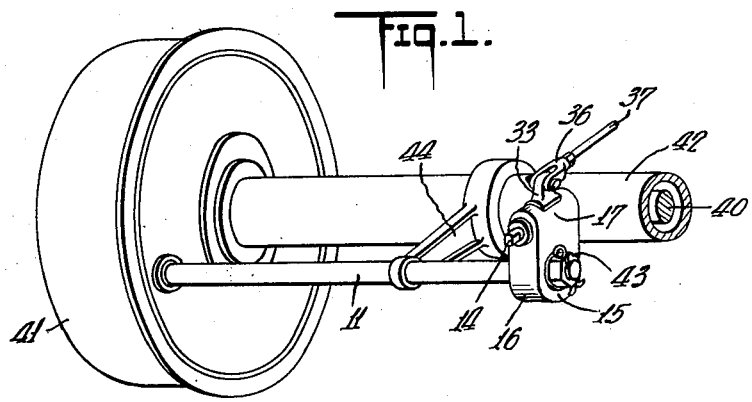

Aug. 20, 1935.　　　C. G. KELLER　　　2,012,011

BRAKE ADJUSTING MECHANISM

Filed May 25, 1933

INVENTOR
Charles G. Keller
BY
ATTORNEYS

Patented Aug. 20, 1935

2,012,011

UNITED STATES PATENT OFFICE 2,012,011

BRAKE ADJUSTING MECHANISM

Charles G. Keller, Hyde Park, N. Y.

Application May 25, 1933, Serial No. 672,770

11 Claims. (Cl. 188—196)

In various types of brakes, wear occurs and causes an increase in clearance between the rotatable and non-rotatable members when the parts are in released position.

One object of this invention is to provide an improved mechanism for easily, accurately and quickly effecting adjustments of this clearance to maintain a substantially constant lining clearance in released position of the brake. This mechanism includes an intermeshing worm and worm wheel enclosed in a housing, and a further object of this invention is to provide certain improvements in such housing for supporting said gearing and connecting it in place.

Still another object is to provide a housing which may be easily and inexpensively constructed of sheet metal, and which may be easily assembled to enclose and provide supports for the gearing.

My improved gearing and housing may be employed for other purposes other than as part of a brake adjusting mechanism.

My improved housing in its preferred embodiment is formed from two U-shaped metal members cut and bent from sheet or plate stock, and interfitted into opposed crosswise relationship, with the arms of one member extending between the arms of the other to form the side walls of the housing, and with the bases of said members forming the end walls of said housing. As a further feature, the bases of said members are curved to conform substantially with the peripheries of the worm and worm wheel to form a compact unit.

The abutting edges of the U-shaped members may be secured together in any suitable manner, preferably by welding, although they may be provided with suitable interlocking parts for fastening the members together. Even if such interlocking parts be employed, it is advantageous that the abutting edges of the members be soldered together so that the housing will be substantially liquid tight and may hold grease or other lubricant therein.

As another feature, the worm and worm wheel are provided adjacent to their ends with spacers engaging the curved end walls and the side walls of the housing, and serve thereby to support said worm and worm wheel in fixed operative position in said housing.

Figure 2:
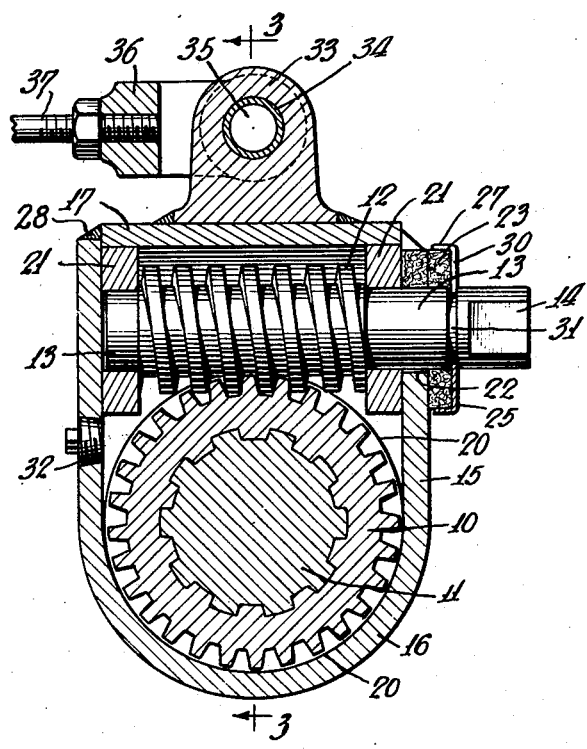
Figure 3:
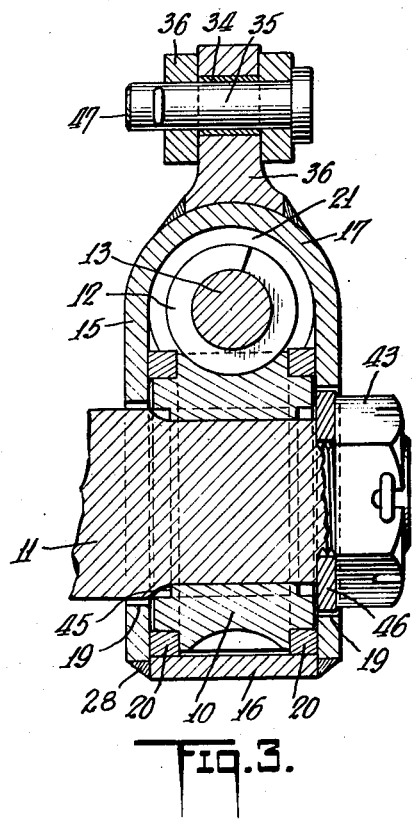

In the accompanying drawing, there is shown for the purpose of illustration, one embodiment of the present invention. In the drawing:

Fig. 1 is a fragmentary plan view of a brake adjusting mechanism embodying my invention, and Figs. 2 and 3 are sections taken in planes at right angles to each other, Fig. 3 being taken on the line 3—3 of Fig. 2.

The brake adjusting mechanism, in the form shown, includes a worm wheel 10 mounted on a shaft 11, and meshing with a worm 12 supported on a shaft 13 which is integral or otherwise connected thereto, and which has an end portion 14 shaped to receive a suitable turning tool.

This gearing is enclosed in a housing 15 comprising a pair of U-shaped members 16 and 17 stamped from sheet metal and interfitted in crosswise opposed relationship, with the arms of one member extending between the arms of the other to form the side walls of the housing, and with the bases of said members forming the end walls of said housing. The outer ends of the arms of one U-shaped member are curved concentrically with the axes of the gears and to partially encircle said gears. The edges of one member may substantially abut the edges of the other member to form an angular recess or groove 28 along the juncture of the two members, so that these members may be easily welded together along said juncture as shown.

The U-shaped member 17 has openings 19 in the arms thereof to permit the shaft 11 to extend through the housing. For supporting the gear 10 in position in the housing 15, there are provided spacers shown in the form of annular washers or collars 20 mounted on reduced end portions of said worm wheel. These collars 20 serve as bearings for the wheel and have their outside diameters slightly greater than the maximum diameter of the worm wheel 10. The base of the U-shaped member 16 is so curved as to peripherally engage said collars along substantially one-half of the peripheries thereof, and thereby space said worm wheel radially from said base.

The collars 20 serve not only to space the worm wheel 10 radially from the base of the U-shaped member 16, but also serve to axially position said wheel between the arms of the U-shaped member 17. For that purpose, the outside radial surfaces of the collars 20 extend axially beyond the ends of the worm wheel 10, and engage the arms of the member 17.

The worm 12 is similarly held in position in the housing 15 by spacers in the form of annular washers or collars 21 encircling the shaft 13 at opposite ends of said worm to serve as bearings therefor, and having outside diameters slightly greater than the outside diameter of said worm. The base of the U-shaped member 17 is semi-cylindrical in shape, and has the inner radius thereof equal to the outer radii of said collars 21 to engage the peripheries of said collars and space said worm radially inwardly from said base. These collars 21 also engage the arms of the U-shaped member 16 to hold the worm 12 against axial movement.

In order to facilitate the mounting of the worm 12 in position in the housing 15, and in order to permit the end portion 14 of the shaft 13 to extend beyond the housing, one of the arms of the U-shaped member 16 is provided with a U-shaped slot 22 extending to the outer end of said arm, and having a width only slightly larger than the diameter of the shaft 13. In order to prevent admission of dust or dirt and the escape of grease or other lubricant from the interior of the housing 13 through the slot 22, there is provided a felt washer 23 encircling and firmly engaging the shaft 13 closely adjacent to the outer surface of the member 16, and having a portion thereof thick enough or supplemented by an additional piece of felt to fill the end portion of the slots 22 and extend into engagement with the outer surface of one of the collars 21.

The felt washer 23 may be maintained in position in any suitable manner but preferably by means of a cap 25 pressed thereagainst, and having a peripheral flange 27 encircling the washer. This cap 25 has a central aperture slightly smaller than the diameter of the shaft 13, and has a radial slit 30 to permit expansion and permit said cap to be forced along the shaft 13 until the inner periphery of said cap snaps into a peripheral groove 31 provided on said shaft.

Means may be provided whereby lubricant, such as grease, may be introduced into the interior of the housing 15. For that purpose, one of the casing members, preferably the member 16, has a tapped hole 32 for receiving a nipple of standard type. The grease delivered to the housing 15 through said nipple finds its way to the teeth of the worm and worm wheel, and is prevented from escaping through the openings 19 and 22 by means of the collars 20 and 21 and the felt washer 23.

In order that the housing may be operatively connected as a part of the brake operating mechanism, there is welded or otherwise connected to the outside of the curved portion of the U-shaped member 17, a lug 33 having an aperture 34 lined with a bushing for receiving a pivot pin 35 for connecting it to the yoke 36 of an operating rod 37. Any other suitable means may be formed or attached to the casing for engaging said rod, and extending in any suitable direction depending on the relative positions of the rod and cam shaft. It might take the form of a sleeve secured to the housing coaxial with the worm wheel, and having an arm of the length and extending in the desired direction.

In assembling the brake adjusting mechanism, the worm wheel 10 and the collars 20 are inserted in the U-shaped member 16 until said collars are seated upon the base of said member. The worm 12 and the shaft 13 with the collars 21 are then placed in position in the open end of the U-shaped member 16, with the shaft in the slot 22 and the worm in mesh with the worm wheel 10. The U-shaped member 17 is then slipped in inverted position over the worm 12 and between the arms of the U-shaped member 16 until the collars 21 seat in the base thereof. The juncture between the members 16 and 17 is then welded, and the felt washer 23 and the cap 25 are fitted in position.

The brake adjusting mechanism may be mounted in any suitable position on a motor vehicle to permit such adjustment from time to time as will compensate for the wear on the band lining. In Fig. 1 is shown one manner in which it may be mounted. In this construction, there is shown a rear wheel axle 40 enclosed in a stationary axle housing 42. Extending substantially parallel to the axle 40 is a rocker cam shaft 11 which operates an internal expanding brake disposed in the brake drum 41. The end of this shaft is splined to receive the worm wheel 10, and may be threaded to receive a nut 43, or apertured to receive a cotter pin. A washer 46 may be used between the worm wheel and the nut or cotter pin to hold the complete assembly in position on the shaft 11.

The cam shaft 11 is shown journaled at a bracket 44 fixed on the stationary axle housing 42. The rod 37 may be operated in any suitable manner from a brake lever, an air cylinder or foot pedal.

When it is desired to adjust the brake shoes, a suitable wrench or other tool is applied to the end portion 14 of the shaft 13 and the latter is rotated to turn the worm wheel 10 and the rock shaft 11, so that any wear in the engaging parts of the brake is compensated for by moving the brake shoes or the like closer to the drum when the parts are in released position.

Although the casing or housing is preferably in the form of two U-shaped members, so far as certain aspects of the invention are concerned, the casing may be two stamped metal sections which may meet in and be welded together in the plane of Fig. 2.

Having thus described my invention, what I claim as new and desire to secure by Letters Patent is:—

1. A brake adjusting mechanism including a worm wheel, a worm meshing therewith, and a housing for said worm and worm wheel, and including a pair of U-shaped members interfitted in opposed crosswise relationship, with the arms of one member extending across the open sides of the other to form the side walls of the housing, and with the bases of said members forming the end walls of said housing, said bases being semi-cylindrical in shape and said side walls having bearings concentric with said bases and with the axes of said worm and worm wheel respectively.

2. A housing for enclosing an intermeshing worm and worm wheel, and including a pair of U-shaped members stamped from sheet metal and interfitted in opposed crosswise relationship, with the arms of one member extending between the arms of the other to form the sides of the housing, and with the bases of said members forming the end walls of said housing, said members, when so interfitted, having the inner edge of one member substantially abutting the inner edge of the other member to form an angular recess around the juncture of the two members, and said members being welded together along said juncture.

3. In combination, a pair of U-shaped members interfitted in opposed crosswise relationship, with the arms of one member extending across the open sides of the other to form a housing, one of said members having a semi-circular base, and the other of said members having apertures coaxial with said base, a pair of intermeshing gears in said housing, and annular collars coaxial with one of said gears and peripherally engaging said semi-circular base for supporting said gear on said latter base.

4. In combination, a worm and a worm wheel meshing therewith, a housing for said worm and worm wheel, comprising a pair of U-shaped sheet metal members interfitted in opposed crosswise relationship, with the arms of one member extending across the open sides of the other to form the side walls of said housing, and with the bases of said members forming the end walls of said housing, and annular spacing members within said housing and adjacent to the ends of said worm and worm wheel respectively and engaging the end walls of said housing for supporting said worm and worm wheel in position against movement transverse to the axes thereof.

5. In combination, a worm, a worm wheel meshing therewith, a housing for said worm and worm wheel, comprising a pair of U-shaped sheet metal members interfitted in opposed crosswise relationship, with the arms of one member extending between the arms of the other to form the side walls of said housing, and with the bases of said members forming the end walls of said housing, the bases of said members being semi-cylindrical in shape, and annular members at the ends of said worm and worm wheel, and having outer diameters greater than the outside diameters of said worm and worm wheel respectively, said members engaging the bases of said U-shaped members and the inner surfaces of the side walls of said housing to support said worm and worm wheel in operative position in said housing.

6. In combination, a pair of U-shaped members interfitted in opposed crosswise relationship, with the arms of one member extending across the open sides of the other to form the side walls of a housing, and with the bases of said members forming the end walls of said housing, a worm wheel in said housing, a shaft for supporting said worm wheel, and extending through one arm of one of said members, a worm meshing with said worm wheel, a shaft for supporting said worm, and having an end portion extending through an arm of the other of said members, and adapted to receive a suitable turning tool for rotating said worm, and annular collars adjacent to the ends of said worm and worm wheel respectively and engaging the inner surfaces of side and end walls of said housing for supporting said worm and worm wheel in said housing.

7. In combination, a shaft, a worm on said shaft, a worm wheel meshing with said worm, a housing for said worm and worm wheel, comprising a pair of sheet metal members welded together and presenting curved end walls, one coaxial with the worm and the other coaxial with the worm wheel, collars entirely within said housing and coaxial with said worm and worm wheel, seating on the end walls of said housing, and held in place solely by contact with said worm, worm wheel and casing, means for connecting said worm wheel to a cam shaft, means connected to said first mentioned shaft and extending outside of said housing for detachably receiving a turning tool, and means connected to said casing for attaching said housing to an operating mechanism, whereby said worm wheel may be rocked about its axis.

8. In combination, a worm wheel having annular hub portions, a pair of collars encircling said hub portions and of slightly greater outside diameters than said worm wheel, a worm meshing with said worm wheel and having a shaft, a pair of collars entirely within said casing encircling said shaft at opposite ends of said worm and of slightly greater outside diameters than said worm, and a casing having substantially semi-cylindrical end walls, one of said walls engaging and supporting the first mentioned pair of collars, and the other end wall engaging and supporting the other pair of collars.

9. In combination, a worm wheel having annular hub portions, a pair of collars encircling said hub portions and of slightly greater outside diameters than said worm wheel, a worm meshing with said worm wheel and having a shaft, a pair of collars encircling said shaft at opposite ends of said worm and of slightly greater outside diameters than said worm, and a casing having side walls and substantially semi-cylindrical end walls, one of said walls engaging and supporting the first mentioned pair of collars, and the other end wall engaging and supporting the other pair of collars, said side walls engaging the opposite outer surfaces of said collars, and one side wall having an aperture through which one end of said shaft extends, and said worm wheel and another of said side walls having alined passages to receive a second shaft.

10. In combination, a worm wheel having a passage therethrough, a shaft extending through said passage and held against rotation in respect to said worm wheel, a pair of collars encircling said worm wheel at opposite ends, and projecting axially beyond the ends of the worm wheel and radially beyond the periphery of the worm wheel, a worm meshing with said worm wheel, and a casing for said collars, worm and worm wheel and having a substantially semi-cylindrical end wall providing a seat for said collars and having side walls engaging with the ends of said collars to position said worm wheel.

11. In combination, a worm wheel, a worm meshing therewith, said worm and said worm wheel each having axially extending bearing portions, two pairs of collars one pair encircling said bearing portions of said worm and extending peripherally of the worm, and the other pair encircling said bearing portions of said worm wheel and extending peripherally beyond said worm wheel, and a housing for said worm and worm wheel and including a pair of substantially semi-cylindrical end walls, one providing a seat for one pair of collars and the other providing a seat for the other pair of collars, and side walls engaging the outer ends of said end walls and secured together and to said end walls to hold said worm and worm wheel in position in said casing.

CHARLES G. KELLER.